June 16, 1942.  W. I. JONES  2,286,988
MOLDING AND LIKE FASTENER AND INSTALLATION THEREOF
Filed July 28, 1936   2 Sheets-Sheet 1
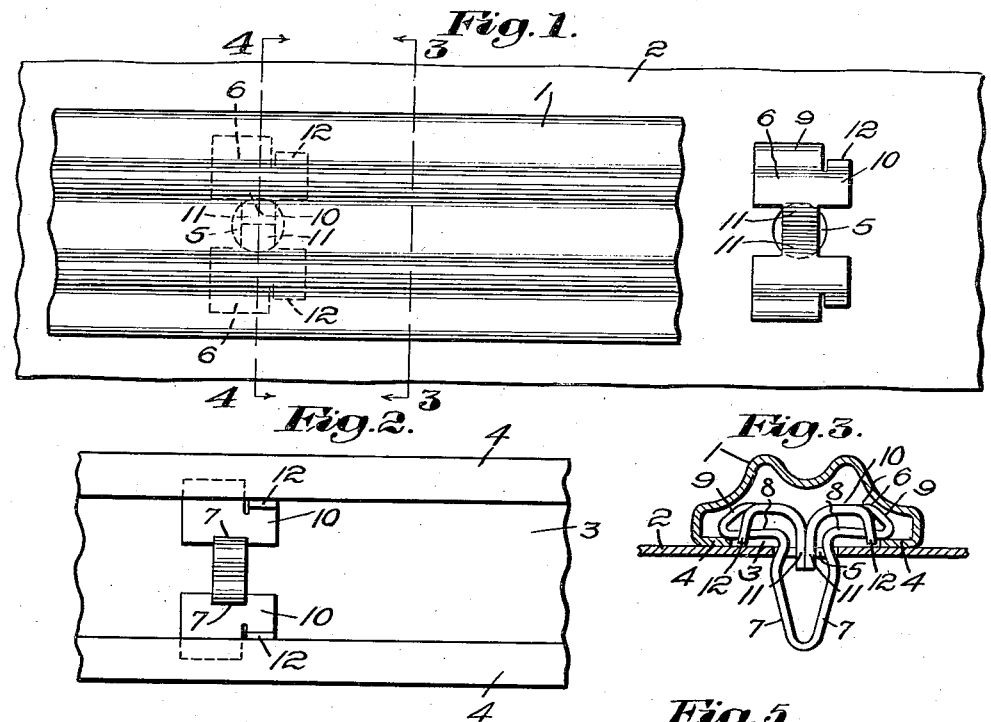
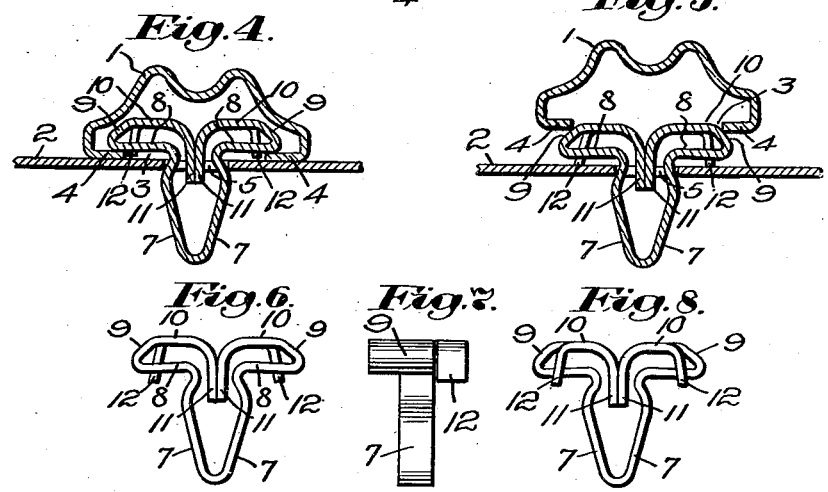
Inventor:
Walter I. Jones June 16, 1942. W. I. JONES 2,286,988
MOLDING AND LIKE FASTENER AND INSTALLATION THEREOF
Filed July 28, 1936 2 Sheets-Sheet 2
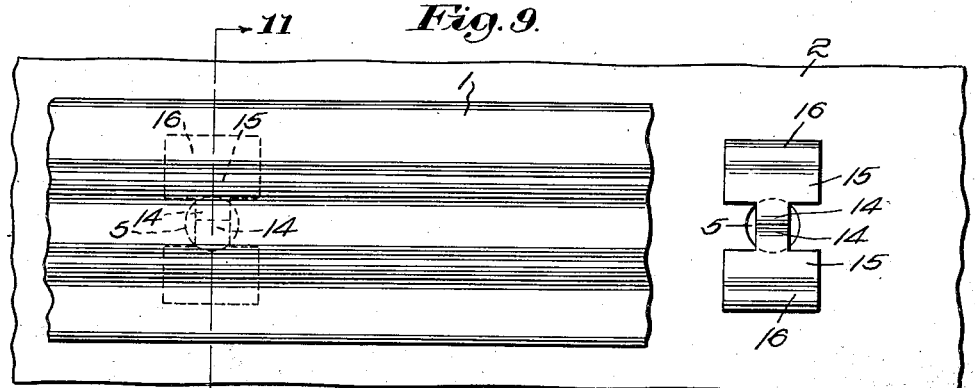
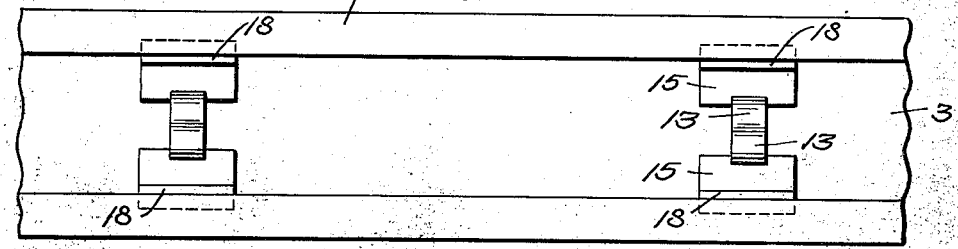
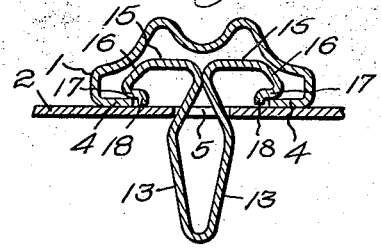
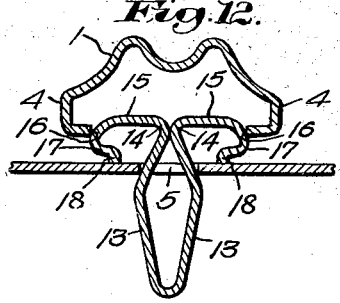
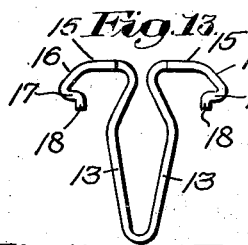
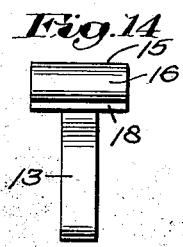
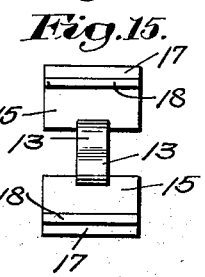
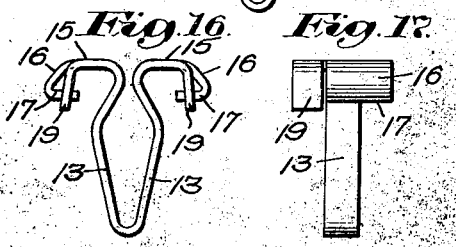
Inventor:
Walter I. Jones Patented June 16, 1942

2,286,988

UNITED STATES PATENT OFFICE 2,286,988

MOLDING AND LIKE FASTENER AND INSTALLATION THEREOF

Walter I. Jones, Arlington, Mass., assignor to United-Carr Fastener Corporation, Cambridge, Mass., a corporation of Massachusetts Application July 28, 1936, Serial No. 93,004

12 Claims. (Cl. 24—73)

My invention aims to provide improvements in fastener secured installations and fasteners for the same.

In the drawings, which illustrate preferred embodiments of my invention:

Figure 1 is a top plan view of a support with my improved molding fasteners attached and a fragment of a hollow molding secured in position by one of the fastener members;

Fig. 2 is a bottom plan view of a hollow molding with my snap fastener member assembled therewith;

Fig. 3 is a section taken on the line 3—3 of Figure 1;

Fig. 4 is a section taken on the line 4—4 of Figure 1;

Fig. 5 is a section similar to that shown in Fig. 4 but showing the hollow molding in position to be snapped over the fastener member;

Fig. 6 is a front view of the fastener member shown in Figs. 1–5;

Fig. 7 is a side view of the fastener member shown in Fig. 6;

Fig. 8 is a rear view of the fastener member shown in Fig. 6;

Fig. 9 is a top plan view of my fastener secured installation comprising a support, a pair of a second form of my fastener members secured thereto and a fragment of a hollow molding secured to the support by means of one of my second form of fastener member;

Fig. 10 is a bottom plan view of a hollow molding with a pair of my second form of fastener members assembled therewith;

Fig. 11 is a section taken along the line 11—11 of Fig. 9;

Fig. 12 is a section similar to that shown in Fig. 11 showing a hollow molding in position to be snapped over the fastener member;

Fig. 13 is a front view of my second form of fastener member;

Fig. 14 is a side view of the fastener member shown in Fig. 13;

Fig. 15 is a bottom plan view of the fastener member shown in Fig. 13;

Fig. 16 is a front view of a third form of my fastener member; and

Fig. 17 is a side view of the fastener member shown in Fig. 16.

My invention, as illustrated in the accompanying drawings, relates particularly, though not exclusively, to a fastener secured installation in which hollow moldings and the like are quickly and easily attached to a supporting structure, such as an automobile body, by means of my improved double snap fasteners. Referring to the drawings, the particular parts chosen to illustrate the use of my improved fastener include a hollow molding 1, such as is now frequently used on the bodies of automobiles and elsewhere, and a relatively thin support 2. It should be understood, however, that my improved fasteners may be satisfactorily used for fastening other parts together than those specifically illustrated in the drawings.

The molding strip 1 is of the type having an aperture 3 running longitudinally of one of its sides. Inwardly-bent flanges 4—4 are provided adjacent the aperture 3. The supporting member 2 is preferably of thin metal material and provided with apertures 5 to receive stud means of my fastener members.

Referring first to the preferred form of my invention, as illustrated in Figs. 1–8 of the drawings, I have provided a simple and sturdy double snap fastener 6 preferably formed of spring metal. My fastener member, as illustrated in Figs. 6–8, has a socket-engaging means composing a pair of yieldable legs 7—7 joined at their outer end and shaped to provide opposed diverging snap fastener engagement with an aperture 5 of portions and converging portions for making the support 2. The free ends of the converging portions of the shank extend outwardly away from one another to provide lateral extensions 8 which are preferably of wider material than that of the legs 7—7. The extensions 8 provide shoulder portions adapted to engage the flanges 4—4 of the hollow molding in a manner which will be described. The free ends of the extensions 8 are continued upwardly in slanting relation to the extensions to form cam portions 9 and the free ends of the cam portions 9 are extended toward each other to provide base portions 10 in substantially parallel relation to the lateral extensions 8. Abutting portions 11 are integral with the base portions 10 and extend downwardly therefrom preferably terminating between the legs 7—7. The abutting portions 11 are of thinner construction than the base portions 10 in my preferred form in order that they may extend through the aperture 5 of the support 2 in the manner shown in Figs. 3–5.

As a result of the particular formation of my fastener member, I have provided a stud portion adapted to extend through the aperture 5 of the support for securing the fastener member thereto, and a pair of shouldered portions adapted to engage the inwardly-extending flanges 4—4 of the hollow molding 1 for attaching the molding to the support. The abutting portions 11 are essential features of the fastener member in that they give a stiffening action to the fastener which is necessary for satisfactory operation of the installation. Integral with the base portions 10 I have formed leg or ear-shaped portions 12, which are sheared from the base portions 10, so as to be independent of the shoulders of the fastener member. The ear-shaped portions extend downwardly in substantially parallel relation to the major axis of the legs 7—7 to a position below the lateral extensions 8 and may be of relatively narrow construction, as shown in Fig. 7. The portions 12 are useful for a double purpose, as will be hereinafter described.

Assembly of the component parts of the installation is a relatively simple matter and may be effected by first inserting the legs 7—7 of the fastener member into the aperture 5 of the support 2. As many fasteners may be provided as are necessary for securing the hollow molding 1 to the support. When the fastener members are secured to the support, the free ends of the ear-shaped portions 12 may engage one surface of the support so as to space the lateral extensions 8 from the support a lesser distance than the thickness of the flanges 4—4 at the time the hollow molding is snapped over the shoulders thereby enabling the inwardly-extending flanges 4—4 of the molding to be easily passed between the lateral extensions 8 and the support, as most clearly shown in Figs. 3 and 4. In assembling the hollow molding with the fastener member the inwardly-extending flanges 4—4 are moved into engagement with the cam portions 9, as shown in Fig. 5, and direct downward pressure is exerted upon the top of the molding so as to force the flanges 4—4 over the cam portions 9 by a snap action. This snap action is accomplished through the natural resiliency provided in the fastener member 6 which may be coupled with a slight resiliency in the hollow molding per se. The abutting portions 11 stiffen the action of the fastener so that a rigid assembly of the parts is provided when the installation is complete.

When the parts of my installation are in assembled relation, the ear-shaped portions 12 are disposed approximately adjacent the edges of the inturned flanges 4, as shown in Figs. 2-4. This feature of my invention is important because it prevents the hollow molding from sliding laterally relative to the fastener so as to enable one of the flanges to be disengaged from a shoulder. The aforesaid lateral movement of the molding relative to the fastener would be quite possible without the ear-shaped portions 12 due to the fact that in my preferred form of installation the cam portions 9 and base portions 10 of the fastener are spaced substantially from the inner face of the hollow molding, as illustrated in Fig. 4. Furthermore, more manufacturing tolerances, between the parts, are possible with the use of portions 12.

In the installation shown in Figs. 9-12 of the drawings I have shown a hollow molding of similar form to that shown in Figs. 1-6 secured to a thin metal support 2 by means of a second form of fastener member. My second form of fastener, as illustrated in Figs. 13-15, comprises a shank having a pair of yieldable legs 13—13 which are joined at one end and provided with diverging and converging portions similar to that of the legs 7—7 of the preferred form of my invention. Abuttable portions 14 are provided adjacent the free ends of the converging portions adapted to move into adjacent relation when the fastener is engaged with the support 2 so as to provide a necessary amount of stiffness in the fastener member. In the second form of my invention shoulders are provided through first extending the free ends of the diverging portions of the legs 13—13 laterally in opposite directions to provide base portions 15, which may be formed of wider material than that of the legs 13—13, then extending the free ends of the base portions 15 downwardly to form cam portions 16 and finally turning the free ends of the cam portions 16 inwardly providing shoulders 17 (Figs. 13 and 15). Leg portions 18 are formed integral with the free ends of the shoulder portions 17 and extend downwardly from the shoulder portions 17 in substantially parallel relation to the major axis of the legs 13—13 (Fig. 13).

In assembling my second form of fastener member with the component parts of the installation, the legs 13—13 are first extended through the aperture 5 so as to secure the fastener member to the support. When the fastener member is assembled with the support the free ends of the leg portions 18 engage one surface of the same so as to space the shoulder 17 from the support to enable the flanges 4—4 of the hollow molding to be snapped over the shoulder and to be finally disposed between the shoulder and the support. In securing the hollow molding 1 to the support, it is first moved into engagement with the cam portion 16 of the fastener, as shown in Fig. 12, and then, by direct downward pressure upon the same, the flanges 4—4 are moved over the shoulder 17 into final position between the shoulders and the support (Fig. 11). As the flanges 4—4 move over the cam portions 16, the natural spring action of the fastener member permits the flanges to become snapped beneath the shoulders 17. Expansion of the portions which fit into the molding is prevented by the legs 18 which are finally disposed in substantially adjacent relation to the edges of the shoulder portions 17, most clearly shown in Figs. 10 and 11. As a result of this abutting of the portions 14—14 a stiffening is given to the fastener member resulting in a rigid assembly of the parts of the installation. When the parts are in final assembly, the leg portions 18 prevent lateral movement of the molding relative to the fastener in the same manner as that provided by the leg or ear-shaped portions 12 of the first form of my fastener member.

In Figs. 16 and 17 I have illustrated a third form of fastener member which is similar to that shown in Figs. 13-15. The third form of my invention is differentiated from my second form in that I have omitted the leg portions 18 which were provided integral with the shoulders 17 of my second form and in place of the same have provided ear-shaped portions 19 sheared from the base 15 and extending beneath the shoulders 17, as most clearly shown in Fig. 16. The operation of my third form of fastener member is exactly the same as my second form except for the fact that the functions of the leg portions 18 of my second form are carried out in my third form by the ear-shaped portions 19. It will be noticed that the purpose and the function of the ear-shaped portions 19 of the third form of my fastener member are exactly the same, in combination with the particularly formed shoulders of my third form, as the ear-shaped portions 12 in combination with the shoulders of the fastener member illustrated in Figs. 1-8.

As a result of my invention I have provided a double snap fastener having opposed stud portions adapted to be snapped into openings in the support or supported member. The invention provides a simple and inexpensive means for quickly securing an apertured member, such as a hollow molding, to a supporting plate. It will be apparent that the size and shape of my improved fastener members could be modified slightly so as to enable the fasteners to be secured to supports of varying thicknesses and it is further apparent that parts other than the specific hollow molding illustrated and described could be snapped over the shoulders provided by my fasteners. My fasteners also act to hold the molding tightly against the support and take care of ordinary variations in thicknesses.

While I have illustrated and described preferred embodiments of my invention, I do not wish to be limited thereby because the scope of my invention is best defined in the following claims.

I claim:

1. A snap fastener member having a shank at one end and a base means at the other end having a pair of independent shoulders movable toward and away from each other, said shank comprising a pair of yieldable legs joined at their outer ends, said base formed of wider material than that of said legs and downwardly-extending leg portions integral with said base and having their ends below and inwardly from said shoulders for cooperation therewith.

2. A fastener member having a pair of legs joined at their leading ends and adapted to extend into an aperture in a support, each of said legs terminating in a lateral extension, each of said extensions having a shoulder means adapted to engage the material adjacent an opening of another part for securing said part to said support, each of said extensions having an integral portion extending downwardly therefrom in substantially parallel relation to the major axis of said legs for cooperation with the shoulder means and abuttable portions of said fastener adjacent said lateral extensions for stiffening the action of said fastener.

3. A snap fastener member having a shank at one end and a base means having a pair of independent shoulders movable toward and away from each other at the other end, said shank comprising a pair of yieldable legs joined at their outer ends, said base formed of wider material than that of said legs, ear-shaped portions integral with said base for cooperation with said shoulders and abuttable portions adjacent to where the legs and base means join to stiffen the action of said fastener.

4. A snap fastener member having a pair of bowed legs adapted to extend into an aperture of a support for securing said fastener member to said support, each of said legs terminating in an outward extension, each of said extensions having a shoulder means adapted to engage the material adjacent an opening of another part for securing said part to said support, portions of said extensions in abutting relation for stiffening the action of said fastener, and said fastener having ear-like portions cooperating with said shoulder means to position a part relative to that end of said fastener.

5. A snap fastener member having a shank at one end and a pair of shoulders movable toward and away from each other at the other end, said shank comprising a pair of yieldable legs joined at their outer ends, said legs shaped to provide opposed diverging portions and converging portions for making snap fastener engagement with a suitable stud-receiving means, said shoulders comprising extensions of the free ends of the converging portions of said shank, said extensions having a laterally extending portion, a cam portion extending upwardly from said laterally extending portion, and abutting portions at the free ends of said cam portion, and said fastener member having ear-shaped portions cooperating with said shoulders to position a part relative to that end of said fastener.

6. A snap fastener for mounting a hollow molding having spaced inturned flanges onto an apertured supporting structure, said fastener formed entirely from a single piece of spring metal, one portion of said fastener having a pair of shouldered legs integral at one end and adapted for snap fastener engagement with said support on direct axial movement through an aperture thereof when applied thereto, a pair of independent loop-shaped portions each connected at one end only to one of the unconnected ends of said legs while being free of connection at the other end with any part of the fastener, said loops being substantially shorter in a direction longitudinally of said fastener than said legs, said loops being engageable with the molding and each of said loops having one end portion abutting the end portion of the other loop to urge the said loops to rigid connected engagement with the molding when assembled therewith, and each loop having a shoulder at its other end for holding the molding against the supporting structure.

7. A snap fastener device of the class described formed entirely from a single piece of spring metal for securing two apertured members together, one portion of said device having a pair of bowed legs connected at one end and converging into close proximity at the other end, and another portion comprising two parts each formed as a continuation from one of said closely proximated ends upwardly and outwardly from the respective leg, then downwardly and inwardly toward the leg, the legs being adapted to engage in the aperture of one of the apertured members and the downwardly and inwardly extending parts being adapted to engage in the aperture of the other apertured member and the closely proximated ends acting as fastener tension controlling means as and for the purposes described.

8. In a fastening device for securing a molding or the like to an object, said device having means to secure the device to the object and a head on which to mount the molding, laterally spaced wings on said head, shoulders on the ends of said wings, said shoulders being engaged by the molding or the like to prevent lateral movement thereof, and spring fingers on the head extending beyond the wings and the shoulders on one side, said spring fingers being capable of yielding when the molding or the like is pressed thereover, said fingers engaging the molding or the like to retain it on the object.

9. In a fastening device for securing a molding or the like to an object, a head on said device comprising flat spaced wings, edges on the ends of the wings adapted to be engaged by the edge of the molding when in place to prevent the lateral movement of the molding, spring fingers on the top projecting beyond and between the end edges of the wings and adapted to yield when the molding is applied, said spring fingers pressing against the molding when in position to prevent the withdrawal of the molding, and means to hold the device to the object.

10. A clip adapted to be applied to an aperture in a supporting structure in fastened engagement therewith, said clip comprising a strip of metal having a bend providing a pair of opposed spaced shank elements, head sections provided from the free ends of said shank elements, said head sections having portions extending inwardly toward each other and including yieldable elements abutting each other to maintain said shank elements in a normal spaced relation greater than the size of said aperture, and one of said shank elements having a shoulder adapted for anchoring engagement in said aperture in the supporting structure.

11. A clip adapted to be applied to an aperture in a supporting structure in fastened engagement therewith, said clip comprising a strip of metal having a bend providing a pair of opposed spaced shank elements, head sections provided from the free ends of said shank elements, said head sections being movable toward and away from each other and having shoulders for engagement with a part to be secured to said support, said head sections having portions extending inwardly toward each other and including elements which are yieldable on movement of said head sections toward each other, and one of said shank elements having a shoulder adapted for anchoring engagement in said aperture in the supporting structure.

12. A clip adapted to be applied to an aperture in a supporting structure in fastened engagement therewith, said clip comprising a strip of metal having a bend providing a pair of opposed spaced shank elements, head sections provided from the free ends of said shank elements, said head sections being contractible and expansible and providing camming portions for engagement with the inturned edges of a hollow molding to contract the head sections and shoulders for engagement within the hollow molding to secure the same rigidly to the support after expansion of the head sections, said head sections having portions extending inwardly toward each other and including elements which are yieldable on contraction of said head sections, and one of said shank elements having a shoulder adapted for anchoring engagement in said aperture in the supporting structure.

WALTER I. JONES.

CERTIFICATE OF CORRECTION.

Patent No. 2,286,988. June 16, 1942.

WALTER I. JONES.

It is hereby certified that error appears in the printed specification of the above numbered patent requiring correction as follows: Page 1, second column, line 23, for "composing" read --comprising--; line 26, strike out the words "snap fastener engagement with an aperture 5 of" and insert the same after "making" in line 27; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.